(12) United States Patent
Kitagishi

(10) Patent No.: US 7,038,722 B2
(45) Date of Patent: May 2, 2006

(54) OPTICAL IMAGING SYSTEM FOR SUPPRESSING THE GENERATION OF RED-TONED GHOSTING PARTICULARLY WHEN THERE IS BACKGROUND LIGHT

(75) Inventor: Nozomu Kitagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 10/096,750

(22) Filed: Mar. 14, 2002

(65) Prior Publication Data

US 2002/0186310 A1 Dec. 12, 2002

(30) Foreign Application Priority Data

Mar. 19, 2001 (JP) .............................. 2001-078877

(51) Int. Cl.
  *H04N 3/14* (2006.01)
  *H04N 5/225* (2006.01)
  *H04N 1/46* (2006.01)

(52) U.S. Cl. ...................... 348/272; 348/340; 348/342; 358/512

(58) Field of Classification Search ................ 348/272, 348/270, 271, 743, 273, 336, 279, 335, 342
See application file for complete search history.

(56) References Cited

U.S. PATENT DOCUMENTS

| 4,759,347 A | * | 7/1988 | Ando | 600/109 |
| 4,916,528 A | * | 4/1990 | Takanashi et al. | 348/290 |
| 5,422,739 A | * | 6/1995 | Usami et al. | 358/512 |
| 6,141,105 A | | 10/2000 | Yahashi et al. | |
| 6,417,973 B1 | * | 7/2002 | Mihara et al. | 359/689 |
| 6,509,973 B1 | * | 1/2003 | Kiyoi et al. | 356/606 |
| 6,865,000 B1 | * | 3/2005 | Yushiya | 358/512 |

FOREIGN PATENT DOCUMENTS

| JP | 56-166685 | | 12/1981 |
| JP | 02-184802 | | 7/1990 |
| JP | 10-170822 | | 6/1998 |
| JP | 2000-314808 | * | 11/2000 |
| JP | 2001-042230 | * | 2/2001 |

* cited by examiner

*Primary Examiner*—David Ometz
*Assistant Examiner*—Nhan T. Tran
(74) *Attorney, Agent, or Firm*—Fitzpatrick, Cella, Harper & Scinto

(57) ABSTRACT

An optical imaging system suppresses the generation of red-toned ghosting in an image particularly when there is a background light or when a strong light source shines on the screen. The optical imaging system has a reflection-type infrared cut filter comprising a multi-layer film, color filters that selectively transmit light according to the wavelength, and an imaging element. Ghosting is suppressed to inconspicuous levels by adjusting the transmittance of the color filters and the infrared cut filter, and by setting the spectral characteristics of the color filters.

13 Claims, 8 Drawing Sheets

OPTICAL IMAGING SYSTEM FOR SUPPRESSING THE GENERATION OF RED-TONED GHOSTING PARTICULARLY WHEN THERE IS BACKGROUND LIGHT

BACKGROUND OF THE INVENTION

1. Field of the Invention

The present invention relates to optical imaging systems in which imaging apparatuses such as video cameras and digital still cameras using two-dimensional solid-state imaging elements such as CCDs, and CMOS devices, are used.

2. Description of the Related Art

Hitherto, imaging optical systems which include solid-state imaging elements such as CCDs, CDMOS devices, and the like, wherein pixels are arranged two-dimensionally with a predetermined pitch, have been widely used in imaging apparatuses such as digital still cameras and video cameras.

In FIGS. 3 and 4 the structures of conventional optical imaging systems are shown. In these figures, reference numeral 31 represents an imaging lens, and reference numeral 32 represents an optical-low pass filter. An IR (infrared) cut coating 38 comprising a multi-layer film is formed on the surface of the imaging-lens side of the optical low-pass filter 32, and this optical low-pass filter 32 also acts as an IR cut filter.

Reference numeral 37 represents an imaging element such as a CCD, a CMOS device, or the like. On-chip microlenses 35 and a color filter 36 are disposed on the imaging-lens side of the imaging element 37 in that order when viewed from the imaging lens to the imaging element. This imaging element 37, the on-chip microlenses 35 and the color filter 36 are hermetically sealed by a package 33 and a sensor cover glass 34.

In optical imaging systems constructed in this manner, image rays incident upon the imaging lens 31 are condensed at the imaging lens 31, and are then further condensed towards each of the light-receiving portions (image pixels) of the imaging element 37 by the on-chip microlenses 35. Only colored light divided into each RGB component by the color filter 36 will efficiently strike the individual light-receiving portions of the imaging element 37.

As shown in FIG. 5, the color filter 36 comprises a red-transmitting filter (R) 61, a green-transmitting filter (G) 62, and a blue-transmitting filter (B) 63, which are formed to correspond to each of the light-receiving portions of the imaging element 37. For each of the filters 61 to 63, material that transmits light selectively according to its wavelength is provided, and the spectral characteristics thereof are as shown in FIG. 6. FIG. 6 shows the spectral characteristic of the blue-transmitting filter 63, indicated by reference numeral 65; the green-transmitting filter 62, indicated by reference numeral 66; and the red-transmitting filter 63, represented by reference numeral 67. In each of the light-receiving portions, colored light, which has been divided into RGB, is incident upon the primary-color filters. Additionally, as shown in FIG. 5, the color filter 36 is arranged according to the Bayer pattern.

The conventional optical imaging systems discussed above can be used without problems under normal conditions. However, in cases where there is background light or when there is a strong light source shining on the screen, the IR cut coating 38 becomes responsible for the generation of unnatural red ghosting on the screen, and thus the image quality is reduced.

An example is the occurrence of ghosting in the light path shown in FIG. 3. When imaging at night, in cases where there is a strong light source like an electric light shining on the screen, a portion of light 101 directed toward the imaging element 37 is reflected by the IR cut coating 38 of the surface of the optical low-pass filter 32, is then reflected by one of the lenses in the imaging lens 31, and is further transmitted through the IR cut coating 38, becoming a ghost that is incident on the imaging element 37.

The following is an explanation of why the ghost takes on a red color. The IR cut coating 38 has the spectral transmittance shown in FIG. 7. However, the spectral reflectance at the time of reflection is the value obtained after subtracting this spectral transmittance from 100%, and therefore becomes a spectral characteristic that is inverted about the 50% line.

The spectral characteristic of the ghosting is calculated as follows:

spectral transmittance×spectral reflectance

FIG. 8 shows a plot of the spectral characteristic of the ghosting for each wavelength. As shown in the figure, in the visible region of the spectrum where the characteristic is flat, and the transmittance of the IR cut coat 38 is near 100%, and in the infrared region of the spectrum and the ultraviolet region of the spectrum where the transmittance is near 0%, an extremely small value is obtained for the intensity of the ghosting when calculated using the above formula.

However, at wavelengths where the transmission of the IR cut coating 38 becomes 50%, the reflectance is also 50%. Therefore, an extremely large value of 25% is obtained for the intensity of the ghosting when calculated using the above formula.

When a ghost having this type of spectral characteristic is transmitted through the color filter 36 and impinges upon the light-receiving elements of the imaging element 37, since the transmittance through the color filter 36 is low for light that has a large intensity at short wavelengths, as shown in FIG. 6, the intensity of the ghost becomes extremely small.

In contrast, with regard to light having a large intensity at long wavelengths, as shown in FIG. 6, since the red-transmitting filter has a structure which does not prevent transmission at the infrared side, the spectral transmittance of the infrared light becomes high, and the intensity of the ghosting becomes extremely large. As a result, the image is recorded with a prominent ghost having a red tone.

Due to this, at the point-symmetrical position of the light source about the center of the image plane, red ghosting, which cannot be seen on silver halide photographs, appears.

One more type of ghosting is the type shown in FIG. 4. When imaging at night, in cases where there is a strong light source like an electric light, a portion of the light 102 toward the imaging element 37 is reflected by the surface of the on-chip microlenses 35, is subsequently reflected by the IR cut coating 38 on the surface of the optical low-pass filter 32, and is then transmitted through the optical low-pass filter 32, becoming a ghost that is incident on the imaging element 37.

With regard to the on-chip microlenses 35, since they have a structure in which the microlenses are regularly arrayed, they simultaneously diffract light as it is reflected at the surface of the on-chip microlenses 35, and a diffraction pattern is exhibited.

This ghost has a red tone for the same reason as the ghost caused by the reflection between the lens surface of the imaging lens 31 and the above-mentioned IR cut coating 38. Consequently, ghosting caused by the on-chip micro lenses 35 and the IR cut coating 38 is generated around the light source as a ghost having a red-toned diffraction pattern, which cannot be seen in silver halide photographs.

Furthermore, for IR cutting filters, in addition to the reflection types discussed above, there are absorption types that, if used, may be able to eliminate this type of ghosting.

However, in general, in the absorption-type IR cutting filters, the thickness in the optical axis direction is large compared to that of the reflection type, and therefore they are not preferable in light of the trends toward imaging apparatus miniaturization.

SUMMARY OF THE INVENTION

It is an object of the present invention to provide an optical imaging system wherein the occurrence of the above-mentioned ghosting is suppressed even when a reflection-type infrared cutting filter is used, and wherein images of a high quality can be obtained even in image pick-ups where there is background light.

In order to achieve the above, an embodiment of the present invention is directed to an optical imaging system having reflection-type infrared cut filters comprising multi-layer film, color filters which can selectively transmit light according to wavelength, and an imaging element. The color filters are made to have a peak transmittance for wavelengths in the range of 580 nm to 650 nm. For the region of the infrared cut filter at 600 nm and greater (toward the longer-wavelength end), in the vicinity of the wavelength at which the transmittance first becomes 50 %, the transmittance of the color filter is made to be lower than that of the infrared cut filter.

In another embodiment of the present invention, an optical imaging system has reflection-type infrared cut filters comprising multi-layer film, color filters which can selectively transmit light according to wavelength, and an imaging element. Again the color filters are made to have a peak transmittance for wavelengths in the range of 580 nm to 650 nm. In the region of the infrared cut filter where the wavelength is 600 nm or greater (toward the longer-wavelength end), when the wavelength at which the transmittance first becomes 50% is $\lambda_{50}$, and the first wavelength at which the transmittance first becomes lower than 25% is $\lambda_{25}$, the spectral transmittances of the color filter and the infrared cut filter are made to satisfy the following:

$$\lambda_{R25} < \lambda_{D50} \quad (1)$$

With this type of structure, it is possible to suppress ghosting, which is due to the reflection of imaging light at the infrared filter surface, (for example, ghosting due to reflection between the lens surface of the imaging lens and the infrared cut filter surface, ghosting due to reflection between the micro lens surface on the imaging elements and the infrared cut filter surface, and so forth) at the color filter.

Particularly, by setting the spectral characteristic so that the above equation is satisfied, it is possible to sufficiently reduce the above-mentioned ghosting to a level where it is inconspicuous.

Furthermore, it is preferable that the wavelength $\lambda_{50}$ at which the transmittance of the infrared cut filters in the region where the wavelength is 600 nm or greater first becomes 50% satisfies the following:

$$650 \text{ nm} < \lambda_{D50} < 780 \text{ nm} \quad (2)$$

If the wavelength $\lambda_{D50}$ surpasses the minimum value and becomes a value of the shorter-wavelength end, the quantity of red light becomes small and problem in color reproduction develops. On the other hand, if it surpasses the maximum value and becomes a value of the longer-wavelength side, since the transmittance of the color filter increases again, fogging due to the infrared light is generated.

Further objects, features and advantages of the present invention will become apparent from the following description of the preferred embodiments (with reference to the attached drawings).

DESCRIPTION OF THE PREFERRED EMBODIMENTS

First Embodiment

Figure 1:
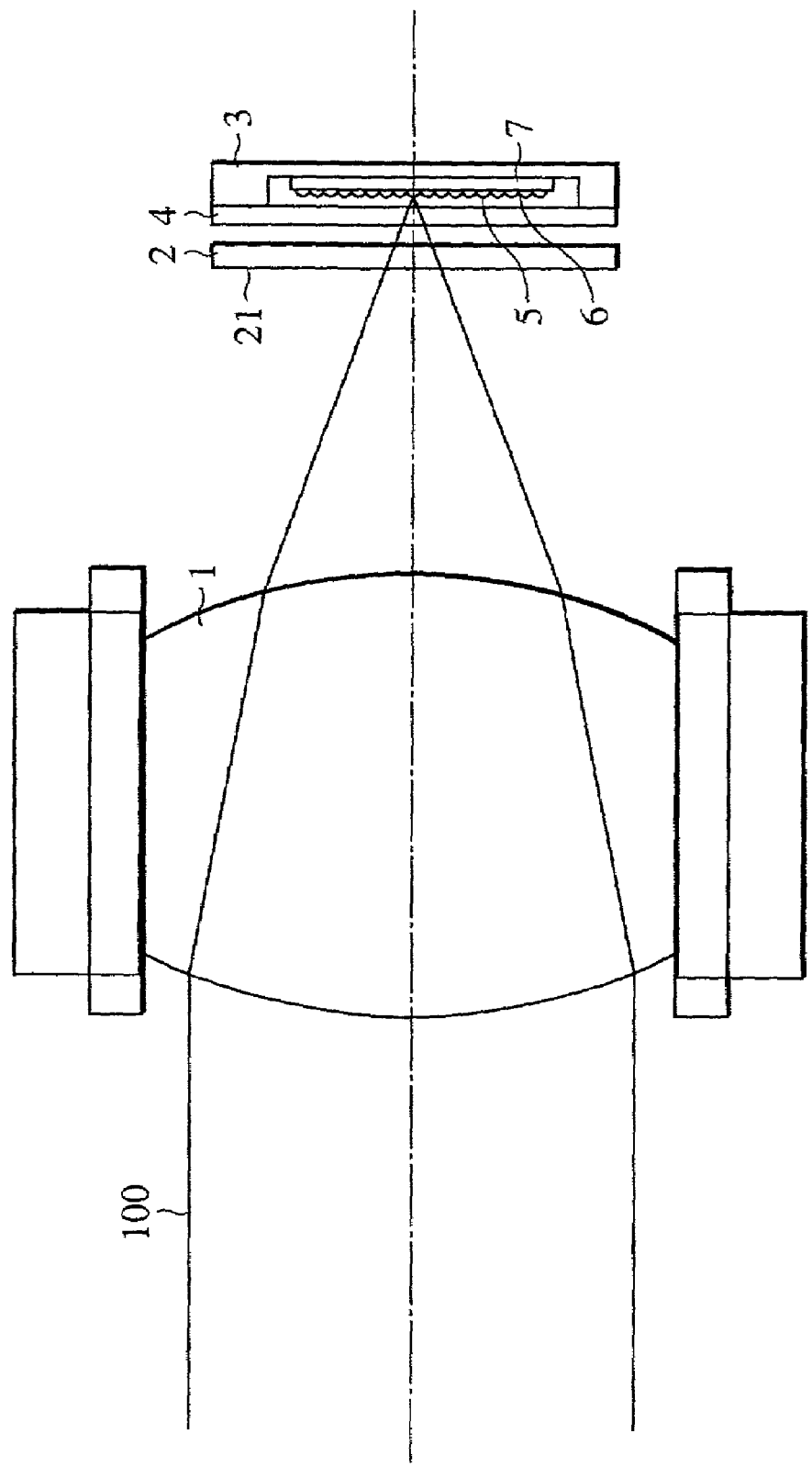
FIG. 1 is a structural diagram of an optical imaging system according to a first embodiment of the present invention.

FIG. 1 shows the structure of the optical imaging system of the first embodiment of the present invention. In the figure, reference numeral 1 represents an imaging lens, and reference numeral 2 represents an optical low-pass filter. An IR cut coating 21, which comprises a multi-layer film, is formed on the surface of the imaging-lens side of the optical low-pass filter 2, and this optical low-pass filter 2 also acts as an IR cut filter.

In this embodiment, the IR cut coating 21 is a so-called reflection-type IR cut filter. In general, compared to cases in which thick, absorption-type IR cut filters are used, the area in which the IR cut filter is disposed can be made small, so that not only can the optical imaging system according to the present embodiment be miniaturized, but so too can the imaging apparatus in which it is incorporated.

Reference numeral 7 represents a solid-state imaging element (photoelectric conversion element) such as a CCD or a CMOS device, etc. On-chip microlenses 5 and a color filter 6 are disposed on the imaging-lens side of the imaging element 7 in that order, when viewed from the imaging lens toward to the imaging element. Furthermore, the imaging element 7, the on-chip microlenses 5, and the color filter 6 are hermetically sealed by package 3 and a sensor cover 4.

In optical imaging systems constructed in this manner, image rays incident upon the imaging lens 1 are condensed at the imaging lens 1, and are then further condensed toward each of the light-receiving portions (image pixels) of the imaging element 7 by the on-chip microlenses 35. The imaging light directed toward each of the light-receiving portions of the color filter 6 is selected, and effectively impinges upon each light-receiving portion of the imaging element 37.

Figure 5:
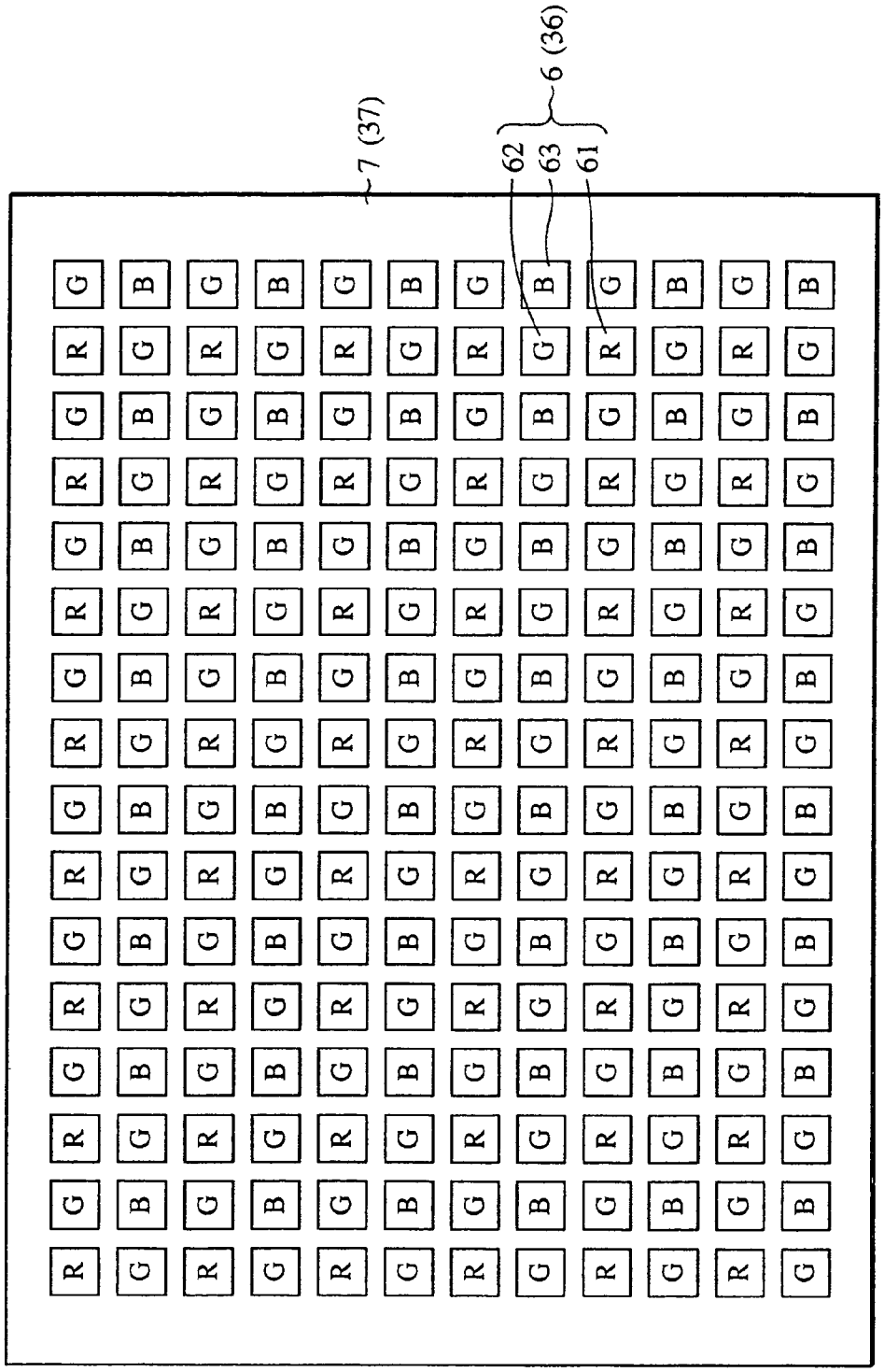
FIG. 5 is a diagram showing the color filter used in conventional optical imaging systems.

The arrangement of each of the colors of the color filter 6 is as shown in FIG. 5. For each of the light-receiving portions of the imaging element 7, material is provided that selectively transmits light according to the wavelength, that is, a red-transmitting filter (R) 61, a green-transmitting filter (G) 62, and a blue-transmitting filter (B) 63. As a result, light divided into each RGB component at the primary-color filters is incident on each of the light-receiving portions.

Figure 2:
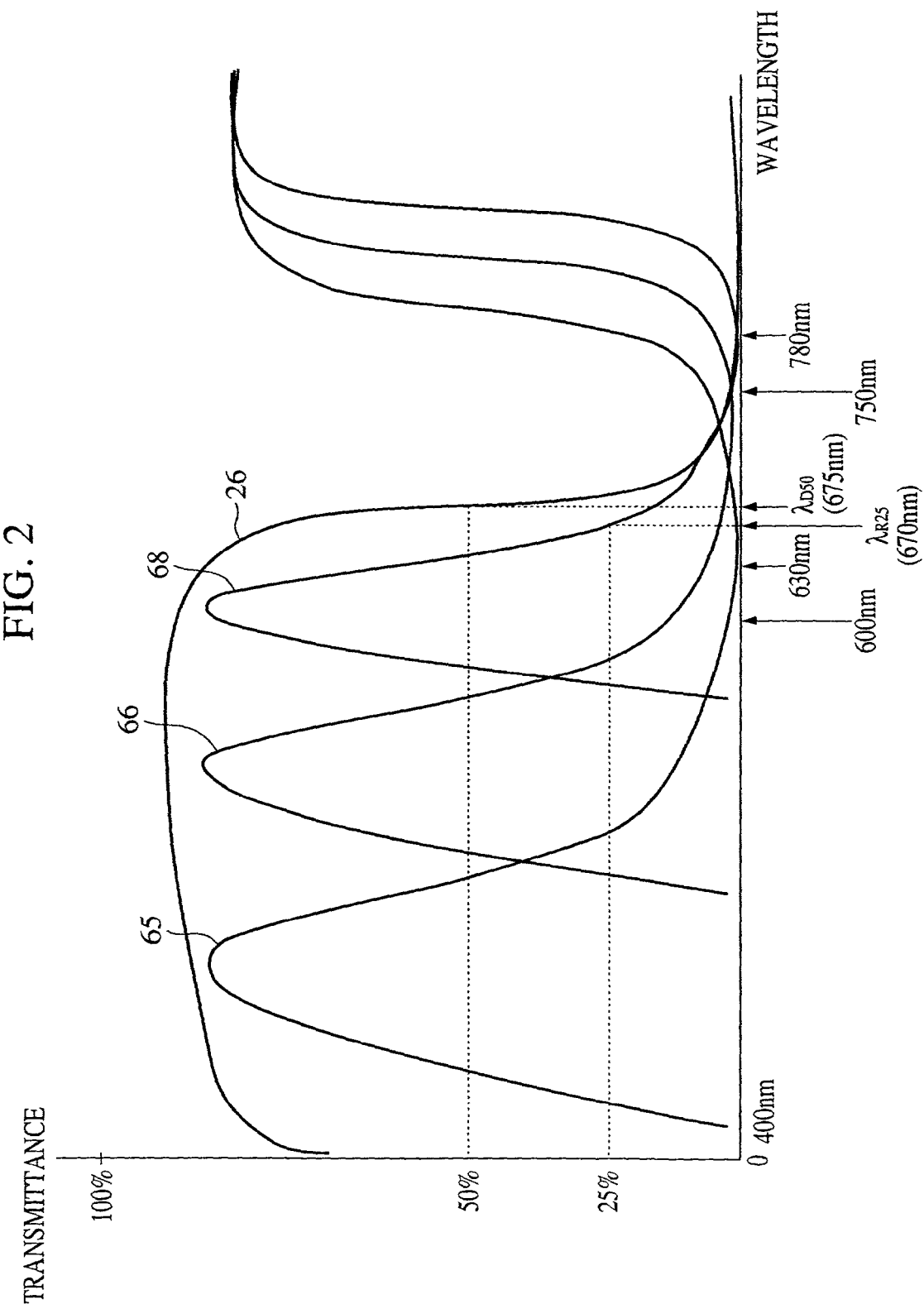
FIG. 2 is a diagram showing the spectral characteristics of the color filter and the IR cut coating of the above-mentioned optical imaging system.
Figure 3:
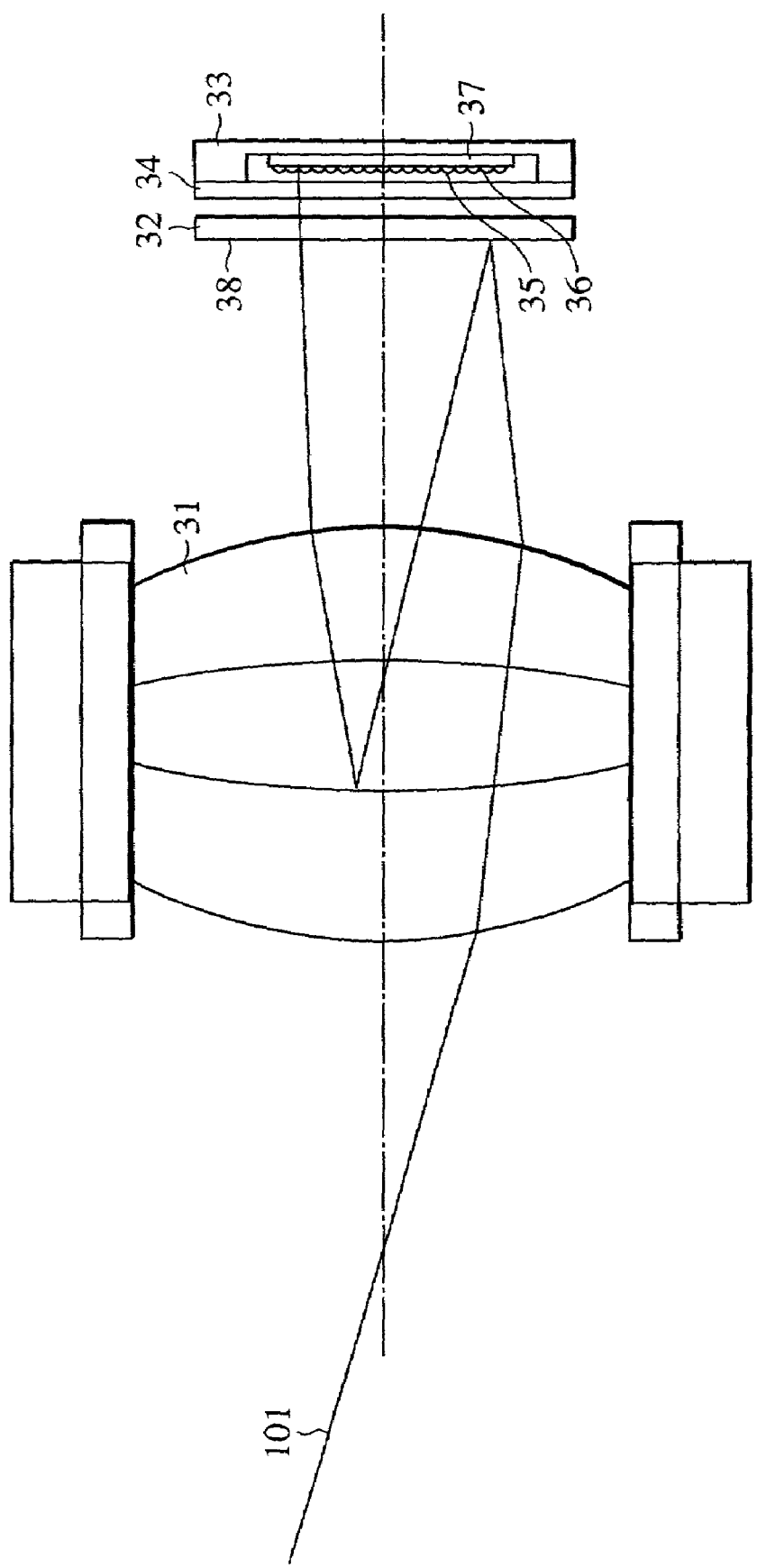
FIG. 3 is a diagram explaining the structure of a conventional optical imaging system and the generation of ghosting.
Figure 4:
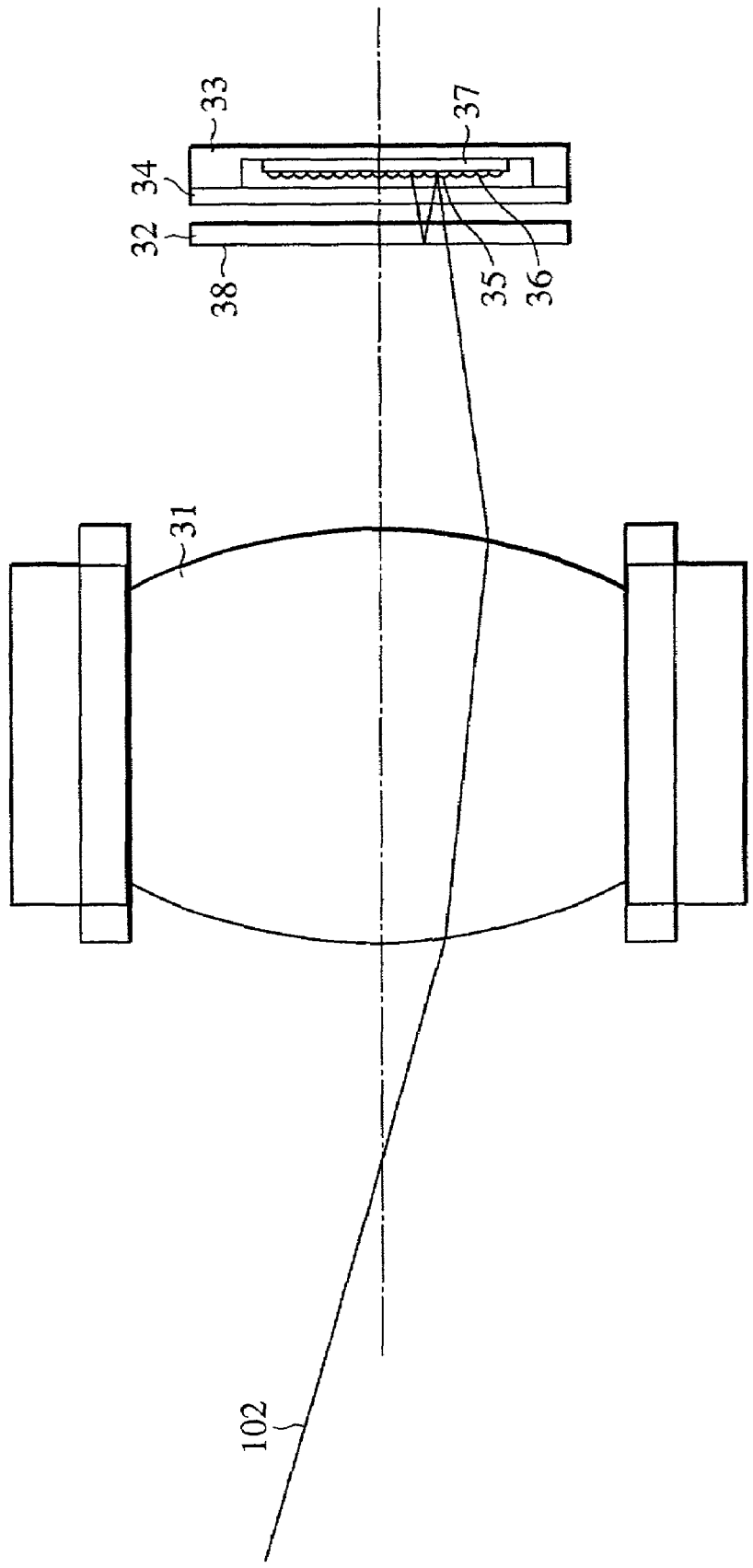
FIG. 4 is a diagram explaining the structure of a conventional optical imaging system and the generation of ghosting.

The spectral characteristic of the IR cut coating 21 and the color filter 6 of the present embodiment are shown in FIG. 2. Reference numeral 26 represents the IR cut coating 21, and reference numerals 68, 66, and 65 are the spectral characteristics of the red-transmitting filter 61, the green-transmitting filter 62, and the blue-transmitting filter 63, respectively.

As shown in FIG. 2, in the present embodiment, in the spectral characteristic of the IR cut coating 21, the wavelength $\lambda_{D50}$ at which the transmittance reaches a peak value of 50%, that is the wavelength having a half-value, is set to 675 nm.

The wavelength $\lambda_{R25}$ is the wavelength at which the transmittance of the region of the red-transmitting filter 61 (that is, the transmission region for red light from among the primary colors of the color filter 6 wherein the wavelength is 600 nm or above) reaches a peak value of 25%. As can be seen in FIG. 2, $\lambda_{R25}$ is set at 670 nm.

Accordingly, the following equation is satisfied:

$$\lambda_{R25} < \lambda_{D50} \tag{1}$$

Figure 6:
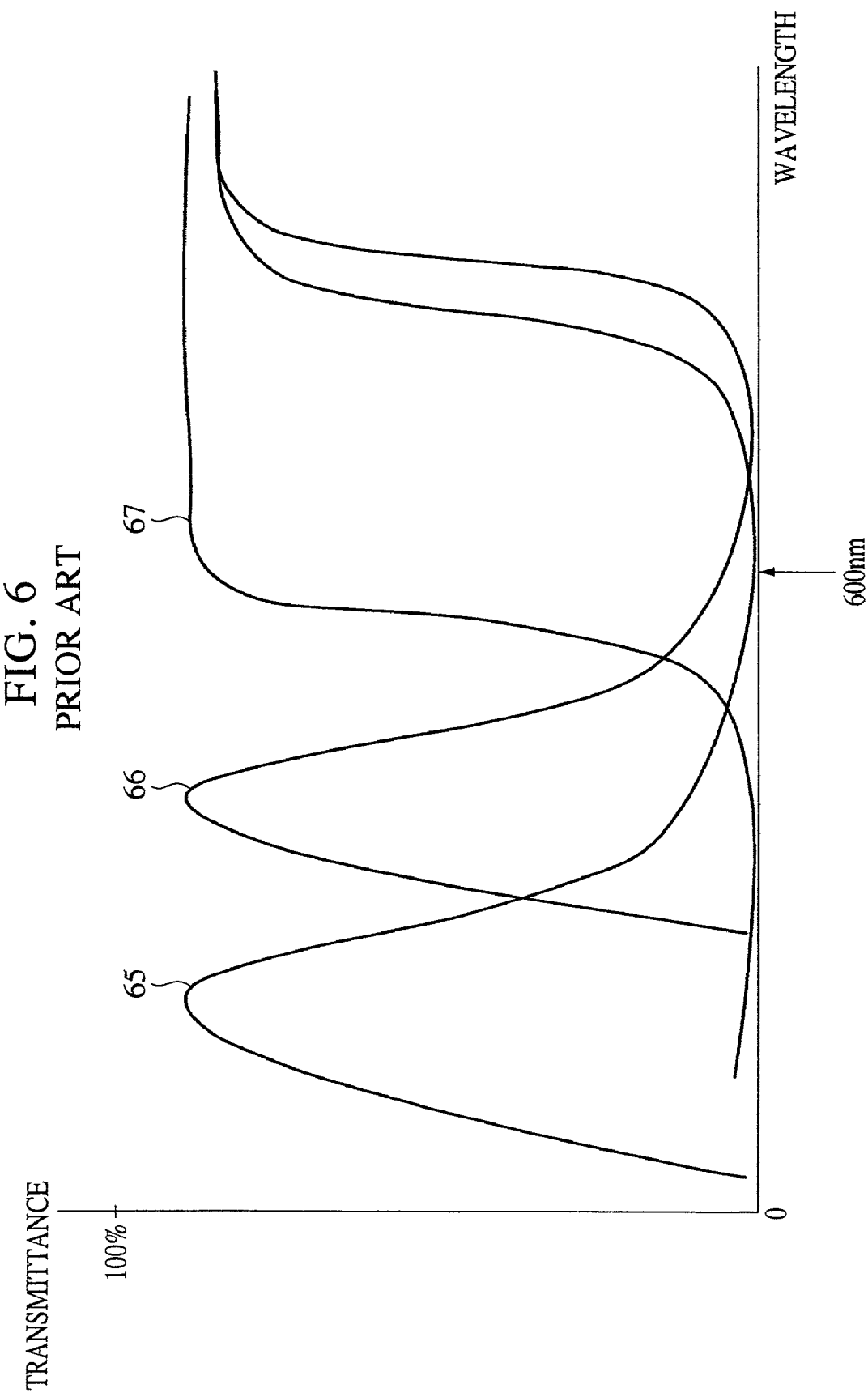
FIG. 6 is a diagram showing the spectral characteristic of the color filter of the conventional optical imaging system.

In other words, the transmittance of the red-transmitting filter in the wavelength-region in the vicinity of wavelength $\lambda_{D50}$ (for example, in the range of 630 nm to 750 nm) is set to be lower than the transmittance of the IR cut coating 21. It is preferable that the green-transmitting filter 62 and the blue-transmitting filter 63 used in the present embodiment be the same as the conventional color filters explained in FIG. 6. On the other hand, for the red-transmitting filter 61, since, unlike in the conventional art, it is necessary to make the transmittance of infrared light low, a filter having properties different from the conventional type is used. For example, for a red-transmitting filter 61, a material having an IR-absorbing material wherein copper oxide is added as coloring agent to a phosphoric acid body, may be mixed into the conventional red-transmitting-filter material. In this type of color filter, if the proportion of the coloring agent, that is, copper oxide (CuO), is made large, the desired absorption characteristic can be obtained, even for thin filters. As another example, it is possible to use a double-layer structure of a conventional red-transmitting filter and the IR-absorbing material discussed above for red-transmitting filter 61.

Figure 8:
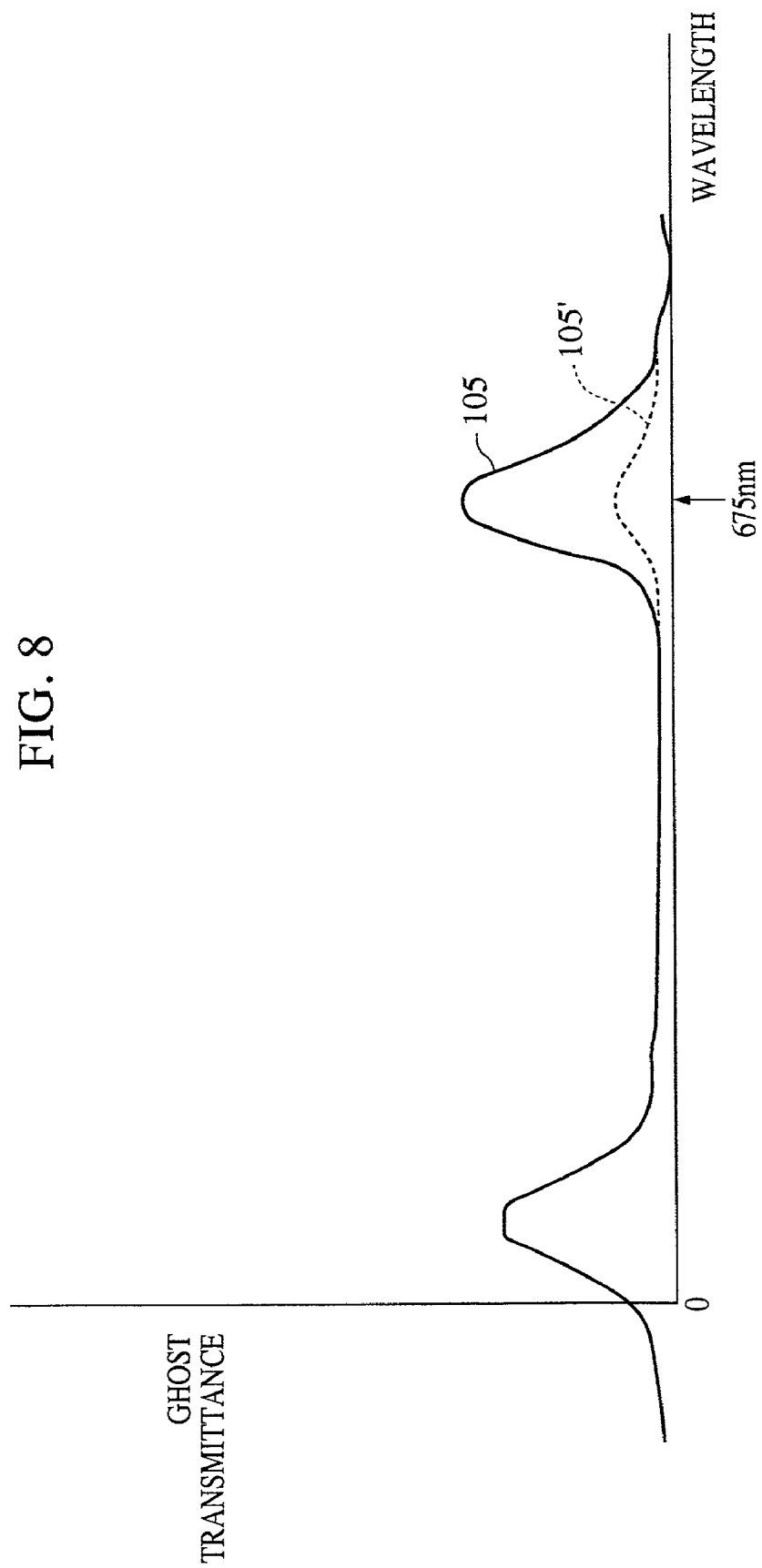
FIG. 8 is a diagram showing the light-intensity distribution of the ghosting of the optical imaging system according to the above embodiment and of the conventional optical imaging system.

According to the present embodiment, the intensity of the red-toned ghosting due to the reflection between the lens surface of the imaging lens 1 and the IR cut coating 21 at the half-value wavelength $\lambda_{D50}$ is 25% of the incident light. However, the transmittance of the red-transmitting filter 61 is nearly 25%. Therefore, it is possible to make the intensity of the ghost received at the imaging element 7 a substantially negligible intensity of 6% of the incident light. In FIG. 8, the intensity distribution of the ghosting of the present embodiment is shown by the dotted line 105'.

In the present embodiment, because the extremely thin IR cut coating 21 is used, high image quality can be maintained (for example, it is possible to reduce spherical aberration, astigmatism, and chromatic aberrations which occur on in a thick, flat plate). In particular, this effect is large for digital single-lens reflex cameras and silver halide single-lens reflex cameras, which use replaceable lenses.

In addition, the IR cut coating 21 is not formed on the surface of the optical low-pass filter 2. Therefore, since there is no increase in the number of parts to form the IR cut filter, the increase in cost is extremely small and an inexpensive imaging optical system and imaging apparatus can be realized.

In a case where the color filter 6 is compared to a reflection type and an absorption type, if the color filter is a transmission/reflection coating type, since the spectral characteristic of the reflected light changes due to the angle of incidence of the light on the color filter 6, there is a possibility that ghosting will occur as a result. Consequently, the color filter 6 is preferably a material having selective transmission-absorption dependent on wavelength. This also holds for the following embodiments.

Second Embodiment

As a second embodiment, $\lambda_{D50}$ approaches the side having long wavelengths with respect to $\lambda_{R25}$ even more than in the first embodiment. The wavelength at which the transmittance in the wavelength region of 600 nm and above of the IR cut coating 21 first reaches a peak value of 50%, that is the half-value wavelength $\lambda_{D50}$, may be set to 700 nm. The wavelength $\lambda_{R25}$ at which the transmittance in the wavelength region of 600 nm and above of the red transmitting filter 61 of the color filter 6, which is the transmission region for the primary color red, first reaches a peak value of 25% may be set to 670 nm.

Also in this case:

$$\lambda_{R25} < \lambda_{D50} \tag{1}$$

is satisfied. The transmittance of the red-transmitting filter in the wavelength region in the vicinity of the wavelength $\lambda_{D50}$ becomes lower than the transmittance of the IR cut coating 21.

Also in the present embodiment, the intensity of the ghost, which becomes red by the reflection between the lens surface of the imaging lens 1 and the IR cut coating 21, is 25% of the incident light. However, the transmittance of the red-transmitting filter 61 is almost 5%. Therefore, the intensity of the ghost received at the imaging element 7 is 1% of the incident light, and the ghosting becomes even less noticeable than in the first embodiment above.

Third Embodiment

The multi-layer film which comprises the IR cut coat 21 of the present embodiment may be, for example, formed such that it is divided onto both surfaces of the optical low pass filter. In the above-mentioned first and second embodiments, the multi-layer film comprising the IR cut coating 21 becomes an enormous structure having 30 to 40 layers if one tries to obtain the desired spectral characteristic. However, if these are separated onto both surfaces, the number of layers of each film can be reduced to 15 to 20 layers. According to the present embodiment, there is no change in the overall number of layers, but one surface can be made thinner, that is, about 20 layers, so that the adhesion between the films improves compared to the case where one surface is 40 layers.

The present invention is also applicable to an IR cut coating having this type of structure.

Fourth Embodiment

In the above first and second embodiments, an explanation was provided for a case wherein the IR cut coating 21 was formed on the surface of the imaging-lens side of the optical low-pass filter 2 disposed in the vicinity of the imaging element 7. However, the position of the IR cut coating is not limited to this configuration. Instead, the vicinity of the imaging elements, the surface of a transparent flat plate specially formed in the vicinity of the mounting member of a replaceable-lens-type camera, the surface of the sensor cover 4, etc., are all possible positions for the IR cut coating.

Fifth Embodiment

In the above first and second embodiments an explanation was provided for the case where the color filter 6 is a primary-color filter. However, it may also be a complementary-color filter.

In this case, among the CMY color filters, the M and Y color filters are color filters having a peak transmittance value in the wavelength region of 580 nm<λ<650 nm.

Consequently, the spectral transmittance of the M and Y color filters and the IR cut coating may be determined so as to satisfy the conditions of the above equations 1 and 2.

Sixth Embodiment

In the above first and second embodiments, an explanation was provided for the case where only a reflection-type IR cut filter is used. However, in addition thereto, an absorption-type IR cut filter may also be used. By doing this the ghost-suppression effect can be improved further.

In this case, the thickness of the absorption-type IR cut filter may be made smaller than the standard thickness.

As explained above, according to the optical imaging system of each embodiment, ghosting caused by the reflection of imaging light at the surface of the IR cut filer can be suppressed by the color filter. Consequently, even in cases of imaging pick-ups with background light or when there is a light source shining on the screen, a high quality image can be obtained.

Particularly, by setting the spectral characteristic to satisfy the above-mentioned equations the above-mentioned ghosting is suppressed to a level where it is sufficiently inconspicuous.

If the wavelength at which the transmittance of the infrared cut filter in the wavelength region of 600 nm and above becomes 50% (towards longer wavelengths) satisfies equation (2) above, this leads to problems in the color reproduction, and it is possible to prevent the generation of fogging due to the infrared light.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical imaging system comprising:
an infrared cut filter comprising a multi-layer film;
a color filter having a peak transmittance in the wavelength range of 580 nm to 650 nm, and selective transmission dependent on wavelength; and
an imaging element on which light passing through the infrared cut filter and the color filter in that order is incident,
wherein, in the wavelength region of 600 nm and above, in the wavelength at which the transmittance of the infrared cut filter first becomes a peak value of 50%, the transmittance of the color filter is lower than the transmittance of the infrared cut filter.

2. An optical imaging system according to claim 1, wherein the wavelength at which the transmittance of the infrared cut filter first becomes a peak value of 50% is in at least the range from 630 nm to 750 nm.

3. An optical imaging system according to claim 1, wherein, in the wavelength region of 600 nm and above, when the wavelength at which the transmittance of the color filter first becomes 25% is $\lambda_{R25}$, and the wavelength at which the transmittance of the infrared cut filter becomes 50% is $\lambda_{D50}$, the following equation is satisfied:

$$\lambda_{R25} < \lambda_{D50}.$$

4. An optical imaging system according to claim 1, wherein, in the wavelength region of 600 nm and above, the wavelength at which the transmittance of the infrared cut filter first becomes 50% is between 650 nm and 780 nm.

5. An optical imaging system according to claim 1, wherein the color filter has selective transmission and absorption dependent on wavelength.

6. An optical imaging system according to claim 1, wherein the color filter comprises a red-transmitting filter, a green-transmitting filter, and a blue-transmitting filter.

7. An optical imaging system according to claim 1, further comprising microlenses, wherein the microlenses and the color filter are disposed so that the light is incident on the imaging element after passing through the infrared cut filter, the microlenses, and the color filter in that order.

8. An optical imaging system comprising:
an infrared cut filter comprising a multi-layer film;
a color filter having a peak transmittance in the wavelength range of 580 nm to 650 nm, and selective transmission dependent on wavelength; and
an imaging element on which light passing through the infrared cut filter and the color filter is incident,
wherein, in the wavelength region of 600 nm or above, when the wavelength at which the transmittance of the color filter first becomes a peak value of 25% is $\lambda_{R25}$, and the wavelength at which the transmittance of the infrared cut filter becomes a peak value of 50% is $\lambda_{D50}$, the following equation is satisfied:

$$\lambda_{R25} < \lambda_{D50}.$$

9. An optical imaging system according to claim 8, wherein, in the wavelength region of 600 nm and above, the wavelength at which the transmittance of the infrared cut filter first becomes a peak value of 50% is between 650 nm and 780 nm.

10. An optical imaging system according to claim 8, wherein the color filter comprises a red-transmitting filter, a green-transmitting filter, and a blue-transmitting filter.

11. An optical imaging system according to claim 8, further comprising microlenses wherein the microlenses and the color filter are disposed so that the light is incident on the imaging element after passing through the infrared cut filter, the microlenses, and the color filter in that order.

12. An optical imaging system for forming an image, generating a ghost image, and suppressing the ghost image, comprising:
an imaging element on which an image is formed;
means for filtering light imaged on said imaging element and generating the ghost image on said imaging element, said filtering and generating means comprising a reflecting-type infrared cut filter generating the ghost image from light that is both reflected by a surface of said infrared cut filter and transmitted through said infrared cut filter to said imaging element; and
means for suppressing the ghost image formed on said imaging element by said filtering and generating means, said suppressing means comprising a color filter positioned between said imaging element and said infrared cut filter and having a peak transmittance in the wavelength range of 580 nm to 650 nm, and selective transmission dependent on wavelength, wherein, in the wavelength region of 600 nm and above, in the wavelength at which the transmittance of the infrared cut filter first becomes a peak value of 50%, the transmittance of the color filter is lower than the transmittance of the infrared cut filter.

13. An optical imaging system for forming an image, generating a ghost image, and suppressing the ghost image, comprising:

an imaging element on which an image is formed;

means for filtering light imaged on said imaging element and generating the ghost image on said imaging element, said filtering and generating means comprising a reflection-type infrared cut filter generating a ghost image from light that is both reflected by a surface of said infrared cut filter and transmitted through said infrared cut filter to said imaging element; and means for suppressing the ghost image formed on said imaging element by said filtering and generating means, said suppressing means comprising a color filter positioned between said imaging element and said infrared cut filter and having a peak transmittance in the wavelength range of 580 nm to 650 nm, and selective transmission dependent on wavelength, wherein, in the wavelength region of 600 nm or above, when the wavelength at which the transmittance of the color filter first becomes a peak value of 25% is $\lambda_{R25}$, and the wavelength at which the transmittance of the infrared cut filter becomes a peak value of 50% is $\lambda_{D50}$, the following equation is satisfied:

$\lambda_{R25} < \lambda_{D50}$.

* * * * *

UNITED STATES PATENT AND TRADEMARK OFFICE
CERTIFICATE OF CORRECTION

| | | |
|---|---|---|
| PATENT NO. | : 7,038,722 B2 | Page 1 of 1 |
| APPLICATION NO. | : 10/096750 | |
| DATED | : May 2, 2006 | |
| INVENTOR(S) | : Nozomu Kitagishi | |

Figure 7:
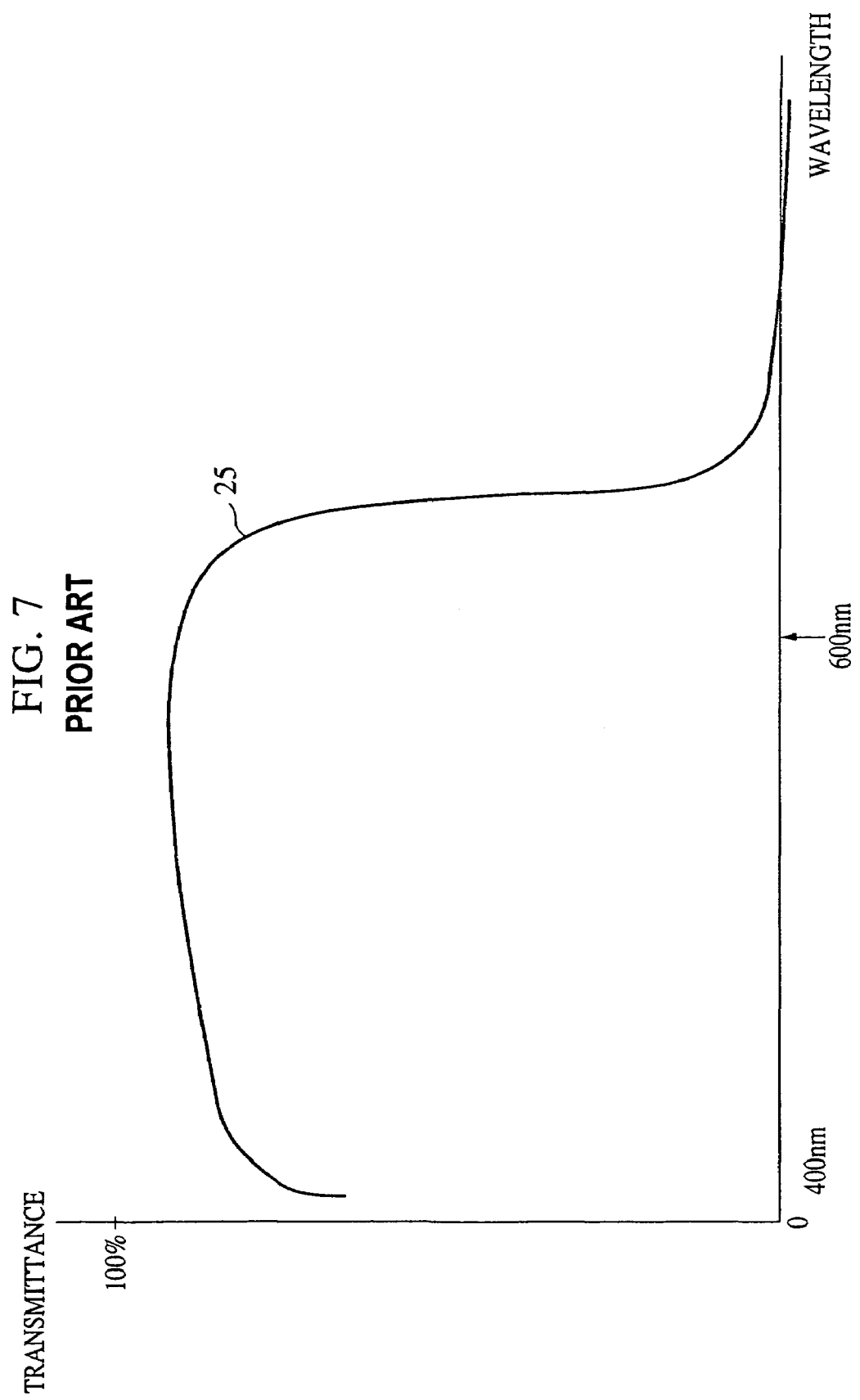
FIG. 7 a diagram showing the spectral characteristic of the IR cut coating of the conventional imaging optical system.

It is certified that error appears in the above-identified patent and that said Letters Patent is hereby corrected as shown below:

<u>Column 4</u>:

Line 18, "FIG. 7" should read --FIG. 7 is--.

<u>Column 6</u>:

Line 64, "embodiments" should read --embodiments,--.

<u>Column 7</u>:

Line 17, "filer" should read --filter--.

Signed and Sealed this

Twenty-sixth Day of December, 2006

JON W. DUDAS
*Director of the United States Patent and Trademark Office*